Sept. 20, 1949.    J. D. RUST    2,482,216
COTTON PICKING MACHINE
Filed March 29, 1944
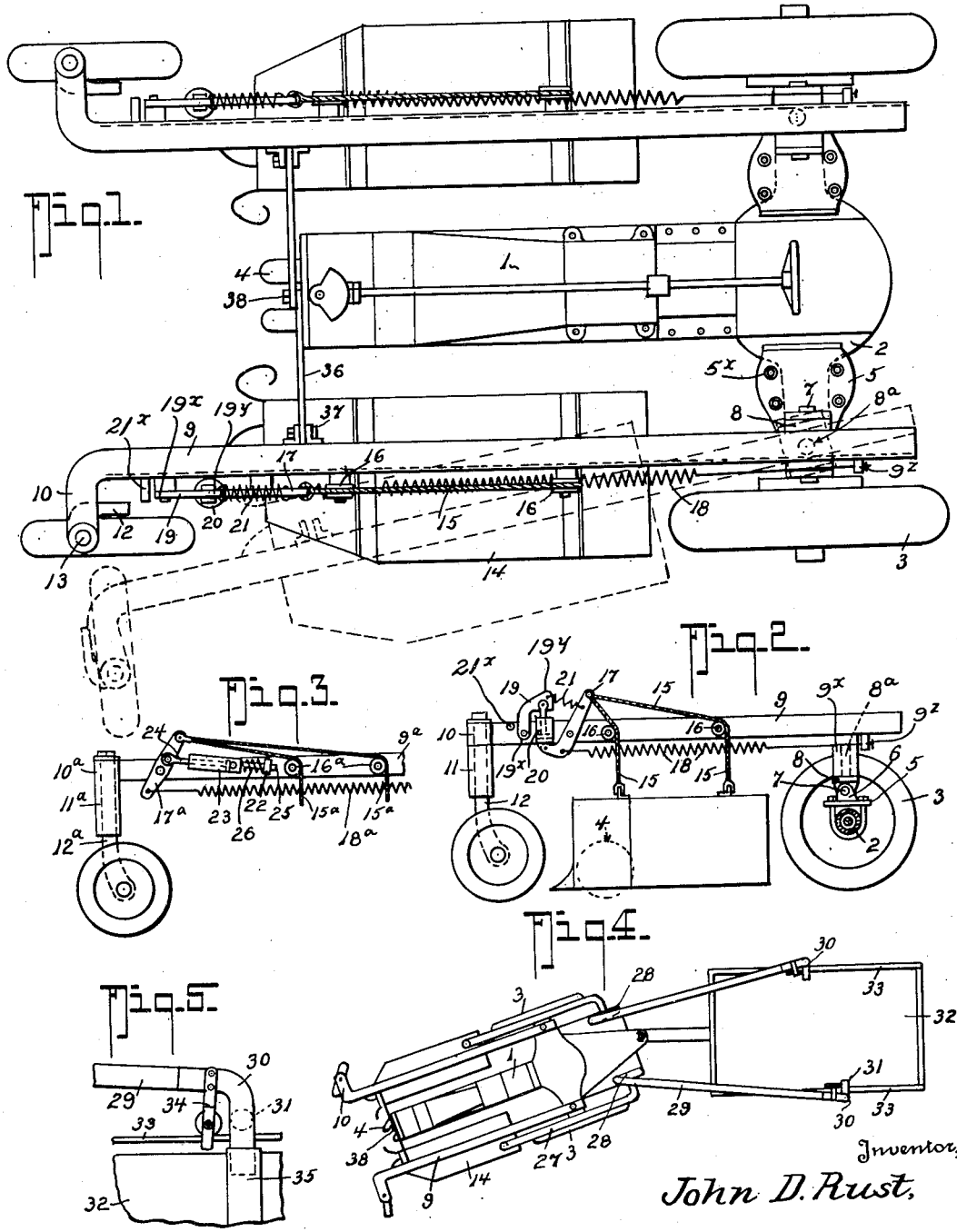
Inventor,
John D. Rust,
By Albert E. Dieterich,
Attorney.

Patented Sept. 20, 1949

2,482,216

UNITED STATES PATENT OFFICE 2,482,216

COTTON-PICKING MACHINE

John D. Rust, Memphis, Tenn.

Application March 29, 1944, Serial No. 528,587

5 Claims. (Cl. 56—11)

1

My invention relates to the type of cotton picking machines illustrated, for example, in Letters Patent No. 2,058,514 issued October 27, 1936.

The present invention has for its objects: to provide a tractor-driven machine in which the picking machine units are located at the side or sides of the tractor and are so mounted that they may be swung away from the tractor in order to facilitate adjustments or repairs; to provide picking machine carrying frames or beams, mounted on the tractor and having castor wheels at the front ends in order that the picking machine units will rise and fall with the contours of the ground and the front ends of the picking machine units will not dig into the ground; to provide means for resiliently suspending the picking machine units from their carrying frames or beams in picking position, and to provide hydraulic means to lift the machine units while maintaining their resilient suspension.

Other objects will in part be obvious and in part be pointed out hereinafter.

To the attainment of the aforesaid objects and ends the invention still further resides in those novel details of construction, combination and arrangement of parts all of which will be hereinafter described in detail and then be specifically pointed out in the appended claims, reference being had to the accompanying drawing in which:

Fig. 1 is a top plan view, somewhat conventional, illustrating my invention.

Fig. 2 is a detail side elevation on a smaller scale of a portion of the structure shown in Fig. 1, a part being shown in section.

Fig. 3 is a detail fragmentary side view showing a modification.

Fig. 4 is a diagrammatic plan view illustrating my invention in use.

Fig. 5 is a detail elevational view of a portion of the mechanism shown in Fig. 4 and hereinafter specifically referred to.

In the drawing in which like numerals and letters of reference indicate like parts in all the figures, 1 represents a tractor of any well known and suitable type having the usual traction wheels 3 and axle housing 2, also the usual steering wheels 4.

In the practical application of my invention, plates 5 are secured to the axle housing in any suitable way (as by U-shaped bolts $5^x$, for example) and have pairs of ears 6 carrying transversely disposed pivot pins 7 on which pins the swivel pin plates 8 are pivoted. Each plate 8

2 carries a swivel pin $8^a$ on which the bearing $9^x$ of a picking machine carrying frame or beam 9 is mounted to turn in a horizontal plane. At the front of each beam 9 the beam has a lateral extension 10 having a swivel bearing 11 for the shaft 13 of a castor wheel carrier 12.

14 indicates cotton picking machine units at each side of the tractor 1. Either one or two units may be mounted on a tractor, two being the preferred arrangement as shown. Each picking machine unit 14 is suspended from a beam 9 by cables 15 which pass over pulleys 16 mounted on the beam and are attached to a lever 17 at one end thereof. A suspension spring 18 has one of its ends anchored as at $9^z$ to the beam 9 in any known and approved way and its other end connected to the other end of the lever 17, the anchorage for the spring to the beam being adjustable for the purpose of adjusting the tension of the spring. In order that the picking machine units may be separately lifted and lowered I provide, for each unit, a lever or arm 19, one end $19^x$ of which is pivoted to the beam 9 and the other end $19^y$ is connected to the lever 17 by means of a spring 21. The arm 19 is also connected to the same end of the lever 17 as that to which the spring 18 is connected, by means of a hydraulic jack device or hydraulic jack 20 through the operation of which the unit 14 may be raised and lowered without affecting the resiliency of the suspension of the unit from its carrying beam 9. Hydraulic fluid is led into the hydraulic jack device 20 from a suitable operator controlled source (not shown) in a conventional manner.

In Fig. 3 is shown a modified way of raising and lowering a picking machine unit. In this figure those parts which are the same as corresponding parts in Fig. 2 bear the same reference character. In this form of the invention the arm 19 is omitted and the hydraulic jack 23 has a rod 25 passing through the aperture of a lug 22 on the beam 9 and held against a buffer spring 26, while the piston rod 24 is pivoted to the lever 17a, as before. In this form when fluid under pressure is admitted into the hydraulic jack 23 the power applied by the spring 18a is augmented and consequently the picking machine unit will be lifted.

The front ends of the beams 9 are connected to the tractor by bars 36 which are hingedly connected to the beams as at 37 and to the tractor as at 38. This permits the beams to rise and fall and, when a bar 36 is disconnected the beam with its suspended picking machine unit may be swung outwardly away from the tractor as shown in dotted lines in Fig. 1 in order that easy access to the tractor and to the machine 14 can be had.

In Fig. 4 I have diagrammatically illustrated the way in which my machine is used. To the tractor is hitched a trailer 32 having side rails 33 at its top. Each picking machine unit 14 has a cotton offtake duct 27 leading to a fixedly located suction blower 28; from the blower 28 a duct 29 conveys the cotton to an elbow 30 where the cottom and trash are separated, the cotton passing through the lateral duct end 31 into the trailer 32 while the trash is discharged to the outside of the trailer through a branch duct 35. The duct 29 carries a strap with a roller 34 that rides on the track rail 33, the arrangement being such that when the tractor is turning, the roller-carried duct end on one side of the trailer will move forwardly while that on the other side of the trailer will move rearwardly.

From the foregoing description taken in connection with the accompanying drawing it is thought the complete construction, operation and advantages of my invention will be clear to those skilled in the art to which it appertains.

What I claim is:

1. In a cotton picking machine wherein cotton picking machine units are mounted on and parallel with a tractor: the improvement which comprises supporting structures for the units, which structures are pivoted at the rear on vertical axes in order that said structures may be swung out laterally at the front away from the tractor for purposes described.

2. In a cotton picking machine wherein at least one cotton picking machine unit is mounted on a tractor at a side thereof: the improvement which includes a beam for carrying the unit; means for mounting said beam adjacent the rear axle housing of the tractor on a vertical pivot and on a horizontal transverse pivot, in order that the beam may have a pivotal movement in a vertical plane and pivotal movement in a transverse direction; means for anchoring the front end of the beam to the tractor to hold the beam parallel to the tractor while the machine is in operation; castor wheels supporting the front of said beam.

3. In a cotton picking machine wherein at least one cotton picking machine is carried by a tractor: the improvement which includes a picking-unit-carrying beam; means for swivelly mounting said beam on the tractor adjacent the rear thereof; a detachable link connection between said beam and tractor for holding the beam alongside the tractor against turning on a vertical axis; a castor wheel supporting the front end of said beam, said beam being swingable from and toward the tractor on its swivel mount as a pivot after said link is disconnected, and capable of rising and falling at its front end according to the contours of the ground being passed over.

4. In a cotton picking machine wherein at least one cotton picking machine is carried by a tractor: the improvement which includes a beam; means for swivelly mounting said beam on the tractor adjacent the rear thereof; a detachable link connection between said beam and tractor for holding the beam alongside the tractor against turning on a vertical axis; a castor wheel supporting the front end of said beam, said beam being swingable from and toward the tractor on its swivel mount as a pivot after said link is disconnected, and capable of rising and falling at its front end according to the contours of the ground being passed over; and a cotton picking unit suspended from said beam; means for resiliently suspending a cotton picking unit beneath and from said beam; and means cooperative with the resilient suspension means for raising and lowering the cotton picking machine at will.

5. In a cotton picking machine wherein at least one cotton picking machine is carried by a tractor: the improvement which includes a beam; means for swivelly mounting said beam on the tractor adjacent the rear thereof; a detachable link connection between said beam and tractor for holding the beam alongside the tractor against turning on a vertical axis; a castor wheel supporting the front end of said beam, said beam being swingable from and toward the tractor on its swivel mount as a pivot after said link is disconnected, and capable of rising and falling at its front end according to the contours of the ground being passed over; and a cotton picking unit suspended from said beam; means for resiliently suspending a cotton picking unit beneath and from said beam; and means cooperative with the resilient suspension means for raising and lowering the cotton picking machine at will, said last named means comprising a hydraulic jack and a spring loaded connection between said jack and said beam.

JOHN D. RUST.

REFERENCES CITED

The following references are of record in the file of this patent:

UNITED STATES PATENTS

| Number | Name | Date |
|---|---|---|
| 1,569,011 | Gilbert | Jan. 12, 1926 |
| 1,894,198 | Rust et al. | Jan. 10, 1933 |
| 2,011,924 | Benjamin | Aug. 20, 1935 |
| 2,082,053 | Freudenberg | June 1, 1937 |
| 2,175,216 | Rust | Oct. 10, 1939 |
| 2,224,285 | Berry | Dec. 10, 1940 |
| 2,325,833 | Cook | Aug. 3, 1943 |